United States Patent [19]
Antonini

[11] Patent Number: 5,348,314
[45] Date of Patent: Sep. 20, 1994

[54] SEALS WITH INDICIA AND METHOD OF MOLDING SEALS WITH INDICIA TO ALLOW INSPECTION AFTER TRIMMING

[75] Inventor: Joseph Antonini, Chicago, Ill.

[73] Assignee: Dana Corporation, Toledo, Ohio

[21] Appl. No.: 30,949

[22] Filed: Mar. 12, 1993

[51] Int. Cl.⁵ .................... B29C 37/00; F16J 15/32
[52] U.S. Cl. .................... 277/152; 249/52; 264/138; 425/DIG. 47
[58] Field of Search ........ 264/40.1, 138, 161, 264/163; 249/52; 277/152, 153, 1; 83/13, 33; 425/DIG. 47

[56] References Cited

U.S. PATENT DOCUMENTS

| | | | |
|---|---|---|---|
| 333,191 | 12/1885 | Anderson | 249/52 |
| 1,535,292 | 4/1925 | Clawson | 249/52 |
| 2,109,078 | 2/1938 | Washo | 249/52 |
| 2,256,973 | 9/1941 | Doherty et al. | 249/52 |
| 3,166,792 | 1/1965 | Goldfarb | 249/52 |
| 3,246,369 | 4/1966 | Rhoads | 277/153 |
| 3,767,739 | 10/1973 | Smith | 264/161 |
| 3,834,717 | 9/1974 | Broad | 277/153 |
| 4,157,833 | 6/1979 | Kozlowski | 277/1 |
| 4,171,561 | 10/1979 | Bainard et al. | 277/153 |
| 4,304,414 | 12/1981 | Forch | 277/153 |
| 4,560,177 | 12/1985 | Riley, Jr. | 277/153 |
| 4,650,195 | 3/1987 | Dreschmann et al. | 277/152 |
| 4,957,680 | 9/1990 | Saxod et al. | 264/161 |
| 5,010,691 | 4/1991 | Takahashi | 49/482 |
| 5,143,385 | 9/1992 | Sponagel et al. | 277/153 |
| 5,186,548 | 2/1993 | Sink | 277/153 |

Primary Examiner—Jay H. Woo
Assistant Examiner—Robert B. Davis
Attorney, Agent, or Firm—Dykema Gossett

[57] ABSTRACT

Indicia creating patterns are placed in a mold assembly used for making seals. The molded seal body includes trimming entry surface indicia and trimming exit surface indicia to provide visual targets to use when setting up equipment to trim a waste portion from the finished seal. The indicia are sized such that a seal is considered properly trimmed if a portion, but not the entirety of the entry surface indicia and exit surface indicia remain on the finished seal at each point of trimming around the circumference of the seal body. Thus, one can quickly determine if a seal is properly trimmed.

16 Claims, 3 Drawing Sheets

SEALS WITH INDICIA AND METHOD OF MOLDING SEALS WITH INDICIA TO ALLOW INSPECTION AFTER TRIMMING

BACKGROUND OF THE INVENTION

The present invention relates generally to seals of the type employed to prevent leakage between mechanical members. More particularly, the present invention relates to an improved seal wherein trimming indicia are used as visual targets for setting up equipment to trim a waste portion from a molded seal body during manufacture.

To work properly, a manufactured seal, particularly a lip seal such as a wheel seal for an automobile, must be produced according to strict specifications. A wheel seal is used to keep the bearings of the wheel lubricated while protecting the bearings from outside contaminants which could interfere with bearing operation. Prior art seals have been molded into a final shape without any trimming. Such seals are designed toward a mean optimal acceptable value and have the advantage of normally consistent production. Yet, untrimmed molded seals often cannot meet required design specifications.

Trimmed seals are also produced according to strict design specifications, having the added advantage of higher initial sealing reliability than non-trimmed molded seals. Unfortunately, it has been very expensive and time-consuming to trim seals in commercial settings. Typically, an operator sets up a trimming operation and then trims a sample seal. A destructive method involving sectioning is then used to inspect samples of the final seals. An iterative process, which is both time-consuming and subject to errors, takes place until a sample seal appears to be correctly trimmed.

Even if a sample seal has been properly inspected, variables associated with a trimming operation may result in unacceptable seals being produced, particularly over time as the trimming operation continues. If this happens, there is generally no non-destructive way to distinguish properly trimmed seals from unacceptable seals.

It is known to have surfaces on seals to provide some guidance for the trimming operation. Typically, such surfaces have been used to guide the entrance of a cutting element into the seal. While such guidance is somewhat beneficial, it still possible for the initially guided cutting element to exit the seal body at a position which results in an unacceptable final trimmed seal part.

SUMMARY OF THE INVENTION

A disclosed seal includes trimming entry surface indicia and trimming exit surface indicia to provide visual targets to use when setting up equipment to trim a waste portion from a finished sealing element. The indicia, which may include either embossed or indented surfaces, are formed by placing a indicia creating pattern, with an opposite surface orientation, within a mold assembly. The mold assembly is then used to mold a seal body having the desired indicia formed in the molded seal body. A waste portion is then trimmed from the seal body by cutting between the entry and exit indicia, leaving a finished seal. The seal may then be easily visually inspected in a nondestructive manner by comparing the actual entry and exit cutting points with the indicia.

In a preferred embodiment, each indicia includes an inner boundary and an outer boundary. The spacing between each of the indicia is selected such that if the cutting element remains within the boundaries at both the entry and exit side, the trimmed seal will be within acceptable tolerances. The diametrically outer boundaries of each indicia should remain with the trimmed seal while the diametrically inner boundaries of each indicia should remain with the waste portion.

The present invention does not require time-consuming, error-prone, or destructive inspection. An operator may easily visually determine whether a seal has been properly trimmed. As a result, one-hundred percent non-destructive visual inspection of all produced sealing elements is feasible, allowing trimming operation modifications to be made easily, and as required at the first indication that a seal has not been properly trimmed.

BRIEF DESCRIPTION OF THE DRAWINGS

The features and inventive aspects of the present invention will become more apparent upon reading the following detailed description, claims, and drawings, of which the following is a brief description:

DESCRIPTION OF A DETAILED EMBODIMENT

Figure 1:
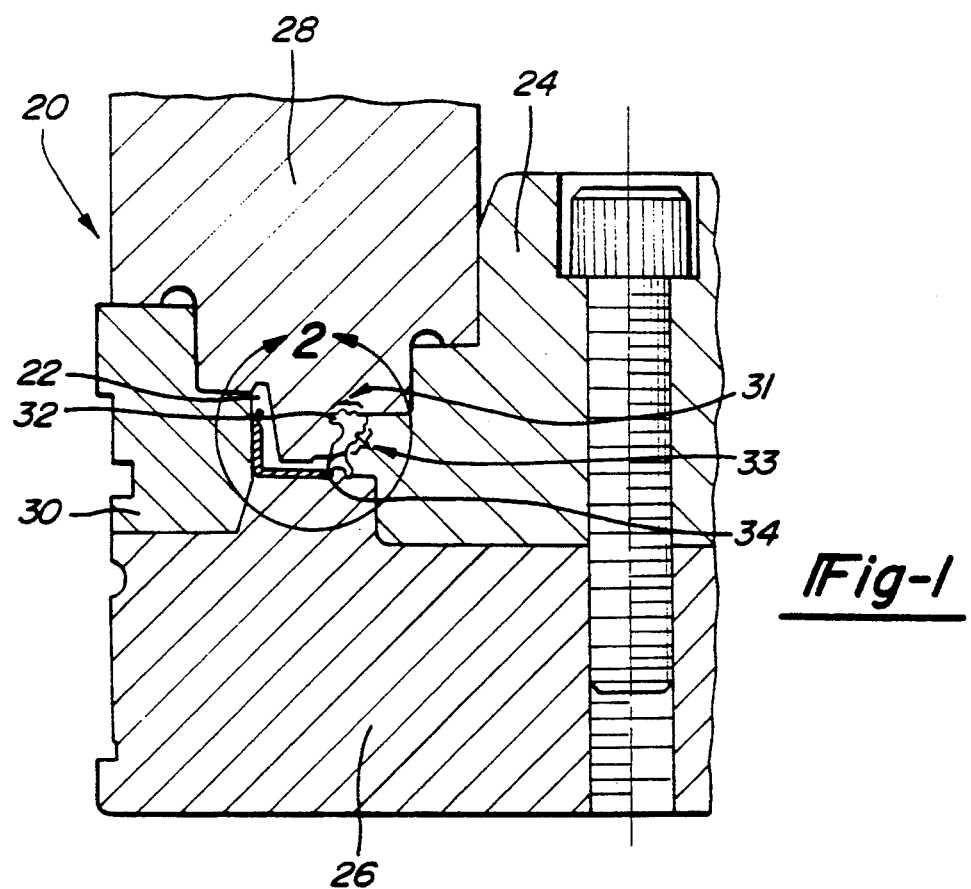
FIG. 1 is a cross-sectional view of a portion of a molding assembly used to form a seal according to the present invention.

A mold assembly 20 for molding a part such as a lip seal body 22 is shown in FIG. 1. Mold assembly 20 includes a male mold 24, a bottom insert 26, a female mold 28, and a stripper ring 30. In operation, material is placed within mold assembly 20, and molded into the shape of lip seal body 22. Preferred materials include rubbers such as nitrile, viton, or silicone, and plastics. The female mold 28 is released, and the stripper ring 30 removed, releasing seal body 22 from male mold 24 and bottom insert 26. A first indicia creating pattern 31 is formed in a wall 32 of mold 28 and a second indicia creating pattern 33 is formed in a wall 34 of male mold 24. Patterns 31 and 33 are used to form either embossed or indented indicia of a corresponding pattern in a seal body 22, although embossed indicia are generally preferred. For example, if embossed indicia are desired then patterns 31 and 33 are recessed in walls 32 and 34, respectively. Possible patterns 31 and 33 include wavy shapes and crosshatches, although a simple pattern is illustrated. The size of indicia creating patterns 31 and 33 are exaggerated in FIG. 1 for illustrative purposes.

Figure 2:
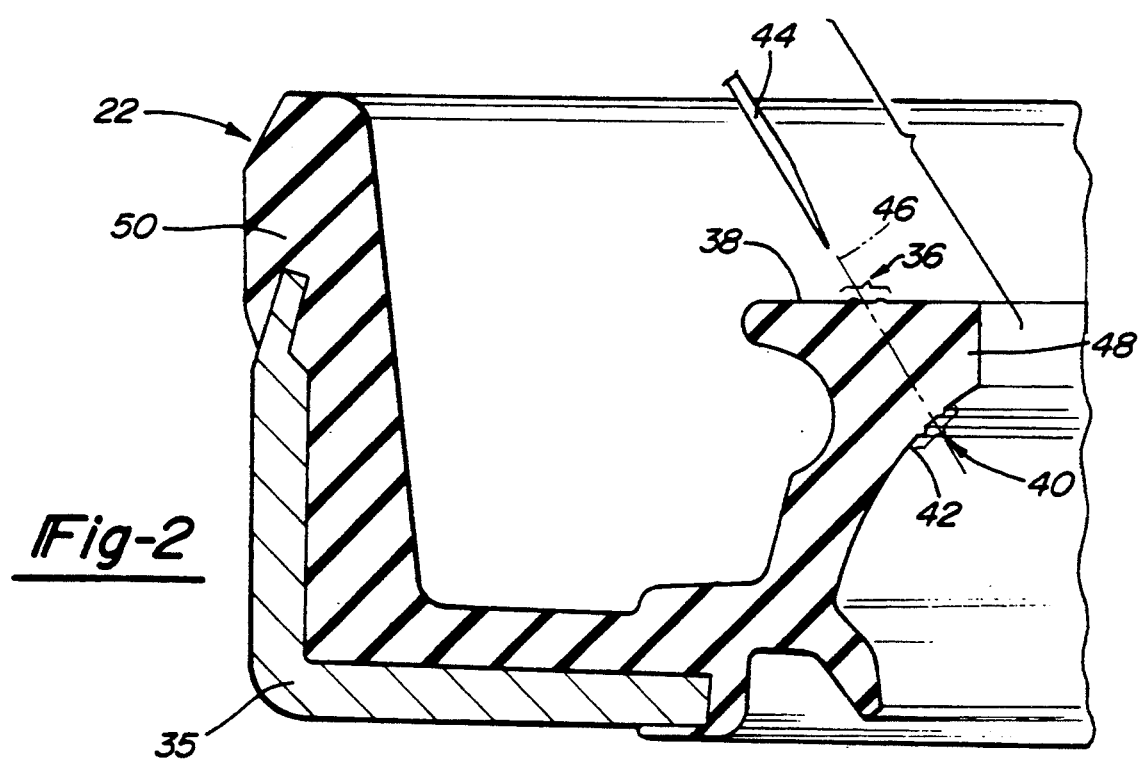
FIG. 2 is a cross-sectional view of a portion of a first embodiment seal of the present invention.

A portion of lip seal body 22, including a plastic or metal insert 35, is shown in FIG. 2. Seal body 22 includes a first indicia 36 formed on a cutting entry surface 38 by pattern 31 (shown in FIG. 1) and a second indicia 40 formed on a cutting exit surface 42 by pattern 33 (shown in FIG. 1). Indicia 36 and 40 have two spaced portions to provide visual targets to use when setting up equipment to trim seal body 22. The distance between the spaced portions of indicia 36 and 40 represent acceptable tolerance limits, as discussed below. A cutting element such as skiving knife 4& trims a cross-sectional path 46 between first indicia 36 and second indicia 40 to separate an annular shaped waste portion 48 from a finished seal, lip sealing element 50. If a portion, but not the entirety, of first indicia 36 and second indicia 40 remain on sealing element 50 at each point of trimming around the circumference of seal body 22, then one can confirm that sealing element 50 has been properly trimmed, as discussed further below. As a result, manufacturing delays and expense are greatly reduced while simultaneously providing a method of non-destructive sealing element inspection. Properly trimmed seals can be produced according to strict design specifications and can be visually inspected.

Figure 3:
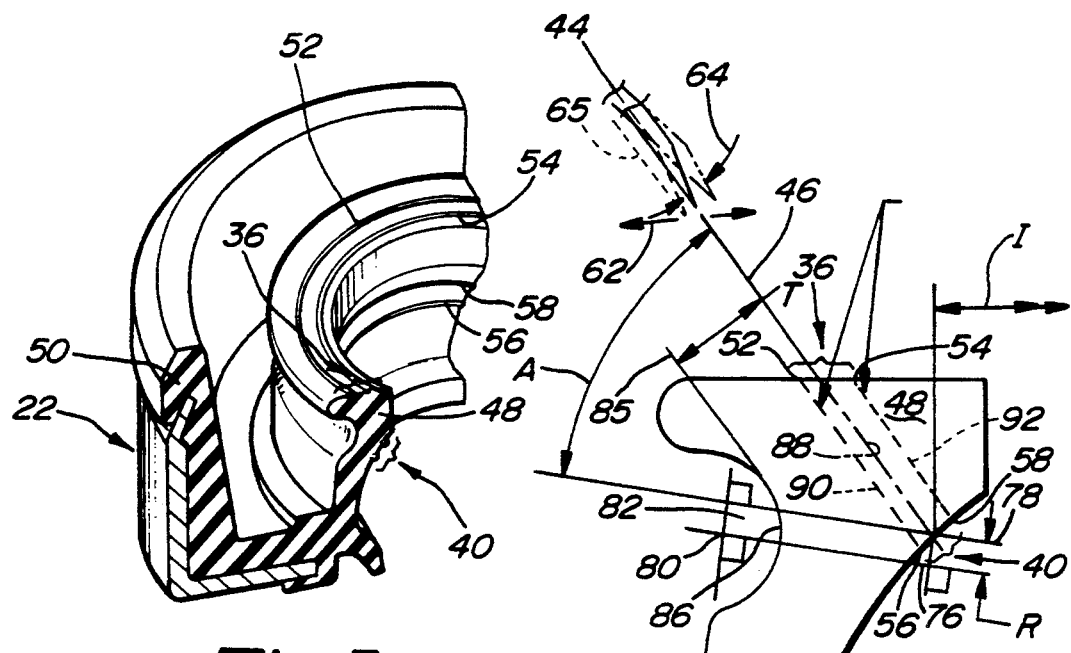
FIG. 3 is a perspective view of the same portion of the first embodiment seal of the present invention.

As best illustrated in FIG. 3, in a preferred embodiment indicia 36 and 40 include delineated inner and outer boundaries. For indicia 36, an outer boundary embossment 52 is spaced from an inner boundary embossment 54 by a predetermined distance. Similarly, for indicia 40, an outer boundary embossment 56 is spaced from an inner boundary embossment 58 by a predetermined distance. For this particular embodiment, solid circumferentially extending or annular embossments 52, 54, 56, and 58 have a preferred height in the range between 0.0005 inches (0.013 mm) and 0.002 inches (0.052 mm) and a width of approximately 0.003 inches (0.08 mm). It is even more preferred that embossments 52, 54, and 58 have a height of 0.001 inches (0.025 mm) while embossment 56 has a height of 0.0005 inches (0.013 mm). While embossments are illustrated, indentations may also be used. In the application shown, if seal 32 is properly trimmed, then embossments 52 and 56 remain with sealing element 50 while embossments 54 and 58 remain with waste portion 48.

Figure 4:
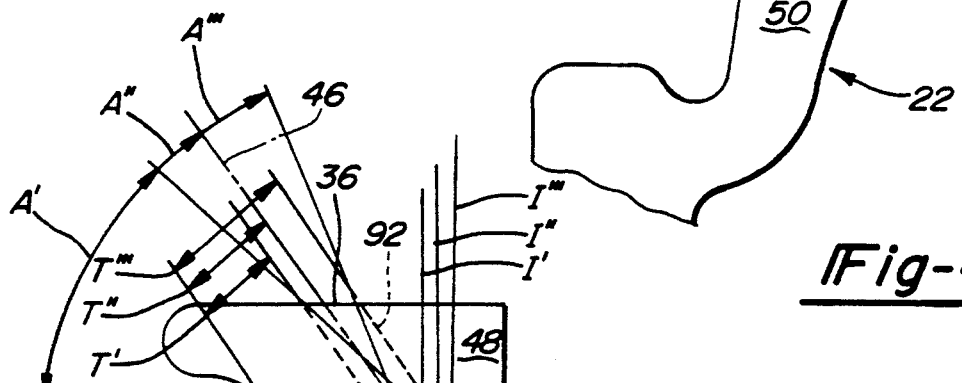
FIG. 4 is a cross-sectional view illustrating several variables to be considered in trimming a lip seal.

The trimming operation for lip seal body 22 is shown in FIG. 4. The ability to position skiving knife 44 in a number of different orientations increases flexibility and is illustrated by arrows 62 and 64 and phantom lines 65. The trimming operation, as herein described, involves several variables that must be considered to properly trim lip seal body 22. Four of these variables are an inner diameter "I", a variable designated "R", a variable designated "T", and a trim angle "A". Inner diameter "I" is the diameter measured at the point at which knife 44 exits seal 20. Variable "R" is the distance between a reference line 76 and a measurement line 78. Reference line 76 extends through the center point 80 of a spring groove 82, perpendicular to a reference surface 84. Measurement line 78 extends from the exit point of knife 44 and is also perpendicular to reference surface 84. Variable "T" represents the distance from a reference line 85 to a trimmed surface 88 created by knife 44. Reference line 85 extends from an inner radius 86 of spring groove 82 and is parallel to trimmed surface 88. Finally, the trim angle "A" is the angle measured between line 78 and trimmed surface 88.

Phantom reference lines 90 and 92 illustrate the outer limits of a potential knife path 46 that will result in a properly trimmed seal. The spacing between lines 90 and 92 represent the tolerance available for the trimming operation. Phantom lines 90 and 92 denote the limits of indicia 36 and 40.

Figure 5:
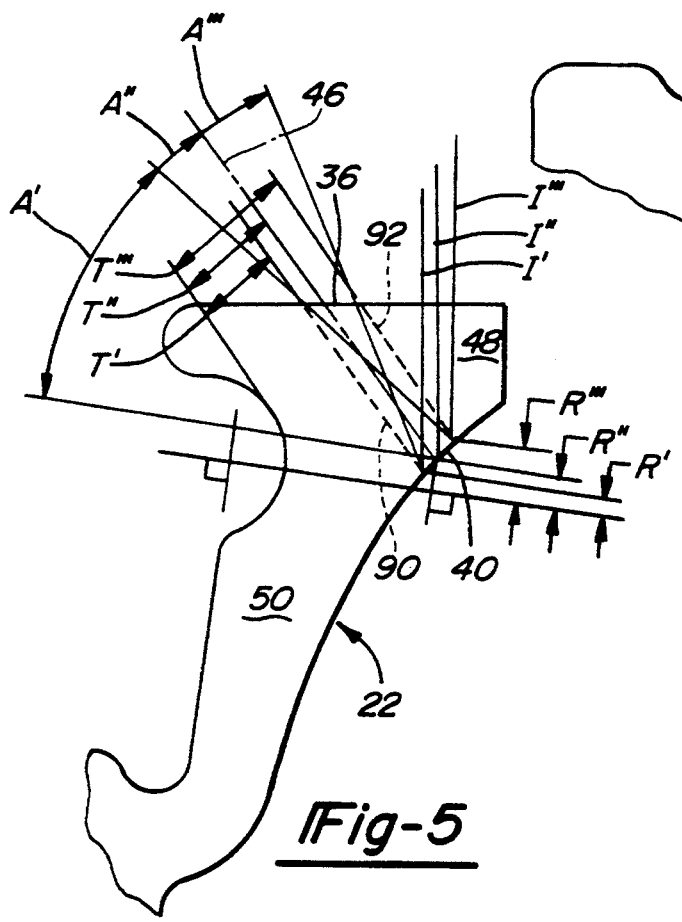
FIG. 5 is a cross-sectional view illustrating a range of values possible for the variables illustrated in FIG. 4.

The determination of the location and size of indicia 36 and 40 for lip seal body 22 is illustrated in FIG. 5. Each of the variables discussed with respect to FIG. 4 has a range of possible values. Inner diameter "I" may have a minimum value of I' or a maximum value of I''' with I'' representing a mean value. Variable "R" may have a minimum value of R' or a maximum value of R''' with R'' representing a mean value. Similarly, variable "T" may have a minimum value of T' or a maximum value of T''' with T'' representing a mean value. Finally, trim angle "A" may have a minimum angular value of A' or a maximum angular value of A''' with A'' representing a mean value. The range of values associated with each of the variables is used to set the location and size of the boundary embossments for indicia 36 and 40 and to delineate acceptable trimming paths 46 between dashed lines 90 and 92.

Figure 6:
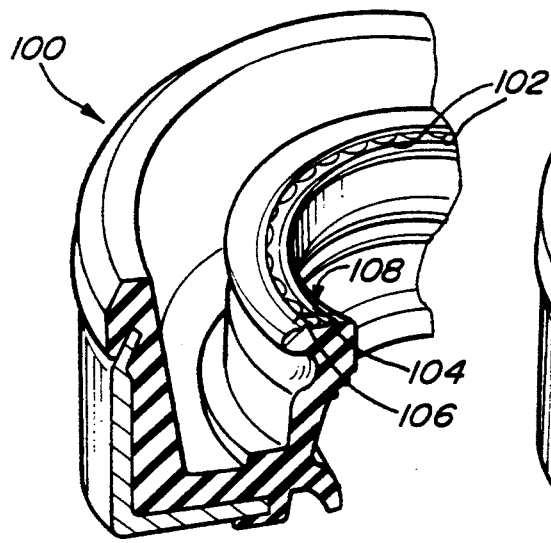
FIG. 6 is a perspective view of a portion of a second embodiment seal of the present invention.
Figure 7:
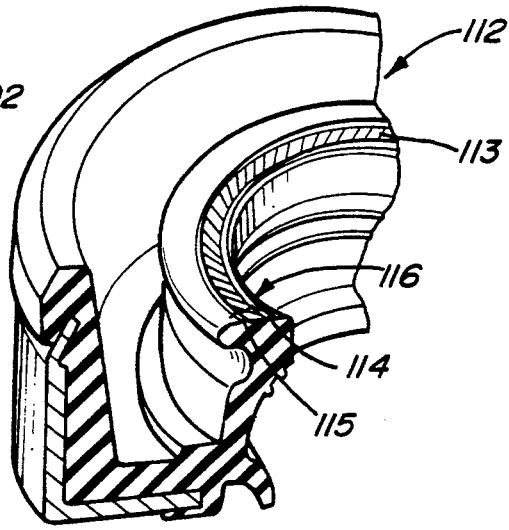
FIG. 7 is a perspective view of a portion of a third embodiment seal of the present invention.
Figure 8:
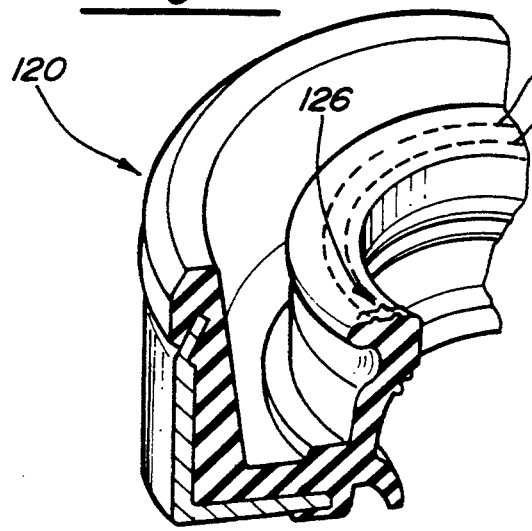
FIG. 8 is a perspective view of a portion of a fourth embodiment seal of the present invention.

FIGS. 6–8 represent different embodiments of indicia according to the present invention. The embodiments improve trimming and the visual inspection of the finished seal. Further, when used at the exit trimming surface of the seal body, the discussed embodiments also provide an improved sealing function for the final seal.

In FIG. 6, a lip seal body 100 includes a plurality of wavy embossments which have a wavy shape or appearance. Arcs 102 extend between an inner boundary annular embossment 104 and an outer boundary annular embossment 106 of an entry trimming surface indicia 108. Arcs 102 may also be used as exit trimming surface indicia. Arcs 102 have a preferred range of heights between 0.0005 inches (0.013 mm) and 0.002 inches (0.052 mm) and a more preferred height of at least 0.001 inches (0.025 mm). Preferably, arcs 102 are approximately 0.003 inches (0.08 mm) wide. With the arcs 102, it is not necessary that boundary embossments 104 and 106 be utilized as the radial extent of the indicia since the arcs define the acceptable boundaries A lip seal body 112 shown in FIG. 7 has a plurality of angled segmented embossments 113 extending between an inner boundary annular embossment 114 and an outer boundary annular embossment 115 of an entry trimming surface indicia 116. Angled segmented embossments 113 may also be used as exit trimming surface indicia. Angled segmented embossments 113 have a preferred range of heights between 0.0005 inches (0.013 mm) and 0.002 inches (0.052 mm) and a more preferred height of at least 0.001 inches (0.025 mm). Preferably, angled segmented embossments 113 are approximately 0.003 inches (0.08 mm) wide, and are angled approximately twenty (20) degrees with respect to boundary embossments 114 or 115. Their direction will vary depending on the shaft rotation.

In FIG. 8, a lip seal body 120 includes a plurality of dashed circumferentially extending or annular embossments 122 and 124, representing the boundaries of an indicia 126. These dashed embossments are used in place solid annular embossments 52 and 54 of the embodiment of FIG. 3.

Figure 9:
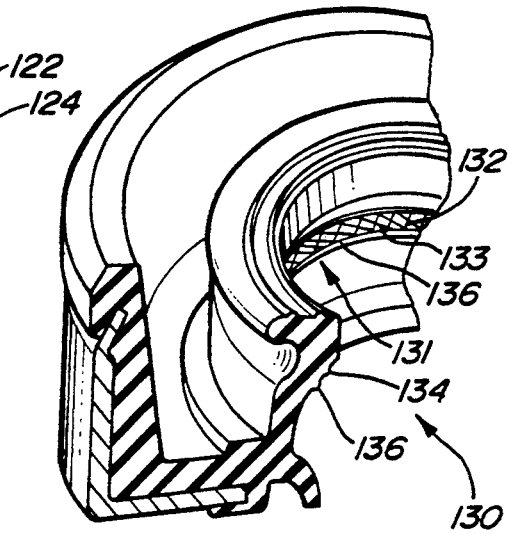
FIG. 9 is a perspective view of a portion of a fifth embodiment seal of the present invention

A lip seal body 130 illustrated in FIG. 9 includes an exit trimming surface indicia 131 having a crisscross or crosshatch arrangement of embossment segments 132 and 133 extending between an inner annular boundary 134 and an outer annular boundary 136. Embossment segments 132 may also be present at an entry surface of lip seal body. Preferably, each of embossment segments 132 and 133 have a preferred range of heights between 0.0005 inches (0.013 mm) and 0.002 inches (0.052 mm) and a more preferred height of at least 0.001 inches (0.025 mm). Preferably, embossment segments 132 and 133 have a width approximately 0.003 inches (0.08 mm), and are angled approximately twenty (20) degrees with respect to boundary embossments 134 or 136.

Preferred embodiments of the present invention have been described. It is to be understood that variations and modifications may be employed without departing from the scope of the present invention. For example, it is possible to have a single annular embossment or indentation for either the entry or exit trimming surface which is associated with the waste portion. To determine whether the final seal was correctly trimmed a measurement must be made from the embossment or indentation after the trimming operation. This usually involves sectioning of the waste portion, but not the final seal. Further, while a lip seal is illustrated, the present invention will be equally useful for a wide range of other molded and non-molded products. Even if a mold is used, it may be modified to provide a different surface finish at the location of desired indicia rather than forming embossments or indentations. An indented step may also be appropriate between boundaries of an indicia to more clearly show an acceptable path for a trimming operation. Accordingly, the following claims should be studied to learn the true scope of the present invention.

I claim:

1. A method for making a trimmed seal comprising the steps of:
   forming a seal body having first indicia on a trimming entry surface and second indicia on a trimming exit surface, each of said indicia including an inner boundary and an outer boundary;
   preparing said seal body by positioning a cutting element with respect to said first indicia and said second indicia of said seal body; and
   cutting between said inner and outer boundaries of said first and second indicia to separate a waste portion from said seal body, leaving a finished seal.

2. A method as recited in claim 1, wherein said forming of said seal body comprises the substeps of:
   placing an indicia creating pattern within mold assembly to create said first and said indicia; and
   molding said seal body within said mold assembly.

3. A method as recited in claim 1, comprising the further step of inspecting said finished seal to confirm that remnant of said first and second indicia remains at each point of said trimming.

4. A trimmed lip seal formed by the process of:
   forming a seal body having first indicia on a first indicia on a trimming entry surface and second indicia on a trimming exit surface, each of said indicia including an inner boundary and an outer boundary representing an acceptable trimming path;
   preparing said seal body by positioning a cutting element with respect to said first and second indicia of said seal body, said cutting element guided to be between said inner and outer boundary of both said first and second indicia; and
   cutting between said first and second indicia to separate a waste portion from said seal body, leaving a finished seal wherein said trimmed lip seal includes a remnant, but not the entirety of said first or second indicia.

5. A trimmed seal as recited in claim 4, wherein a plurality of embossments or indentations extend between said inner and outer boundary of at least one of said indicia.

6. A lip seal comprising:
   a seal body having a first indicia on a trimming entry surface and a second indicia on a trimming exit surface, wherein each said indicia includes an inner boundary and an outer boundary, a spacing between said inner boundary and said outer boundary representing an acceptable trimming path to separate a waste portion from said seal body.

7. A lip seal as recited in claim 6, wherein said seal body is molded.

8. A method for making a trimmed seal comprising the steps of:
   forming a seal body having first indicia on a first surface and second indicia on a second surface;
   preparing said seal body by positioning a cutting element with respect to said first indicia and said second indicia of said seal body;
   cutting between said first and second indicia to separate a waste portion from said seal body, leaving a finished seal;
   determining a range for said first and said second indicia that results in acceptable tolerances for said finished seal;
   spacing an inner boundary and an outer boundary of said first and second indicia to correspond to said range; and
   guiding a cutting element along a path between said inner and outer boundary of said first and second indicia.

9. A method as recited in claim 8, wherein said forming of said seal body comprises the substep of forming an annular embossment or indentation at each said inner and outer boundary of at least one of said first and second indicia.

10. A method as recited in claim 8, comprising the further step of forming a plurality of angled segmented embossments or indentations between said inner boundary and said outer boundary of at least one of said first and second indicia.

11. A method as recited in claim 8, comprising the further step of extending a plurality of wavy embossments or indentations between said inner boundary and said outer boundary of at least one of said first and second indicia.

12. A lip seal comprising:
   a seal body having a first indicia on a trimming entry surface and a second indicia on a trimming exit surface, said indicia dimensioned such that they can be used as a visual indicator of a trimmed seal within acceptable tolerances, wherein each of said indicia includes an inner boundary and an outer boundary, a spacing between said inner boundary and said outer boundary representing an acceptable trimming path to separate a waste portion from said seal body such that said seal body has acceptable tolerances, said seal body including a remnant, but not the entirety of said first and second indicia at each point of said trimming path.

13. A part as recited in claim 12, wherein said boundaries of said indicia include an embossment having a height between 0.0005 inches and 0.002 inches and a width of at least 0.003 inches.

14. A lip seal as recited in claim 12, wherein embossments or indentions are formed between said boundaries of said indicia.

15. A lip seal as recited in claim 14, wherein a plurality of angled embossments or indentions extend between said boundaries of at least one of said indicia.

16. A lip seal as recited in claim 14, wherein a plurality of wavy shaped embossments or indentions extend between said boundaries of at least one of said indicia.

* * * * *

UNITED STATES PATENT AND TRADEMARK OFFICE
CERTIFICATE OF CORRECTION

PATENT NO.   :   5,348,314
DATED        :   September 20, 1994
INVENTOR(S)  :   Joseph Antonini It is certified that error appears in the above—identified patent and that said Letters Patent is hereby corrected as shown below:

Column 5, line 55, "first indicia on a" is deleted.

Signed and Sealed this

Thirteenth Day of December, 1994

Attest:

BRUCE LEHMAN

Attesting Officer        Commissioner of Patents and Trademarks